United States Patent

Wilkerson

[15] 3,648,375
[45] Mar. 14, 1972

[54] SUPPORT FOR A PORTABLE WHEEL ALIGNER

[72] Inventor: Edward D. Wilkerson, Washington Valley Road, Morristown, N.J. 07960

[22] Filed: Apr. 16, 1970

[21] Appl. No.: 29,024

[52] U.S. Cl. ........................33/46 W, 33/203.18, 248/279
[51] Int. Cl. ...................................................A47f 5/00
[58] Field of Search...............248/16, 279, 124, 274, 278, 248/285, 286, 324, 325, 326; 33/46 W, 203.18

[56] References Cited

UNITED STATES PATENTS

| | | | |
|---|---|---|---|
| 1,275,311 | 8/1918 | Schumacher | 248/279 |
| 3,358,957 | 12/1967 | Lindenmuth | 248/279 |
| 3,338,545 | 8/1967 | Magi | 248/181 X |
| 2,910,775 | 11/1959 | Muller et al. | 33/46 W X |
| 2,962,980 | 12/1960 | Carrigan | 33/46 W X |
| 3,398,453 | 8/1968 | Hurst | 33/46 W |
| 2,765,540 | 10/1956 | McMillen et al. | 33/203.18 |
| 3,101,553 | 8/1963 | Rish | 33/203.18 |
| 2,777,211 | 1/1957 | Martin | 33/203.18 X |

*Primary Examiner*—J. Franklin Foss
*Attorney*—Augustus G. Douvas

[57] ABSTRACT

A support for a portable wheel aligner unit to carry adjustably the aligner unit from a storage position to a position adjacent a vehicle wheel to be aligned. The support comprises a pair of telescoping arms adapted to extend an adjustable length, swing about a vertical axis, and also to tilt through a limited angular range in a vertical plane. One end of the telescoping arms is clamped to a runway of a pit, power, or drive-on vehicle rack. The other end of the arms carry an extensible post which supports a ball which is received by a loosely mating socket which is an integral part of the aligner unit. A spring retaining yoke is coupled to the aligner unit to enable relative movement of the aligner with respect to the post. The foregoing structure enables an operator to conveniently store the aligner unit and bring it into operating position on a vehicle wheel without the necessity for manually lifting the total weight of the aligner.

4 Claims, 9 Drawing Figures

PATENTED MAR 14 1972 3,648,375

INVENTOR
EDWARD D. WILKERSON

By *A. G. Douras*
ATTORNEY

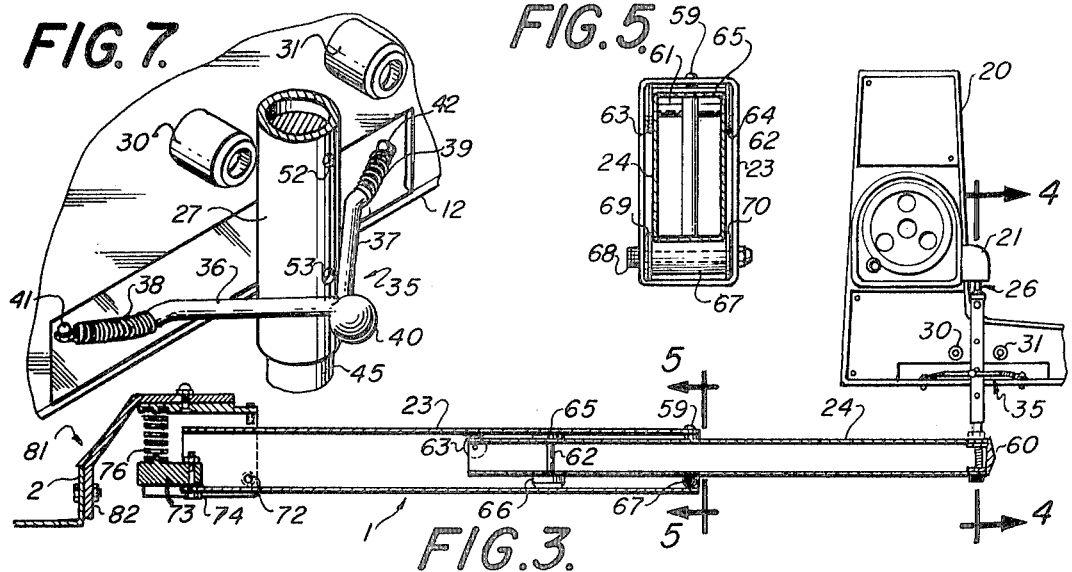
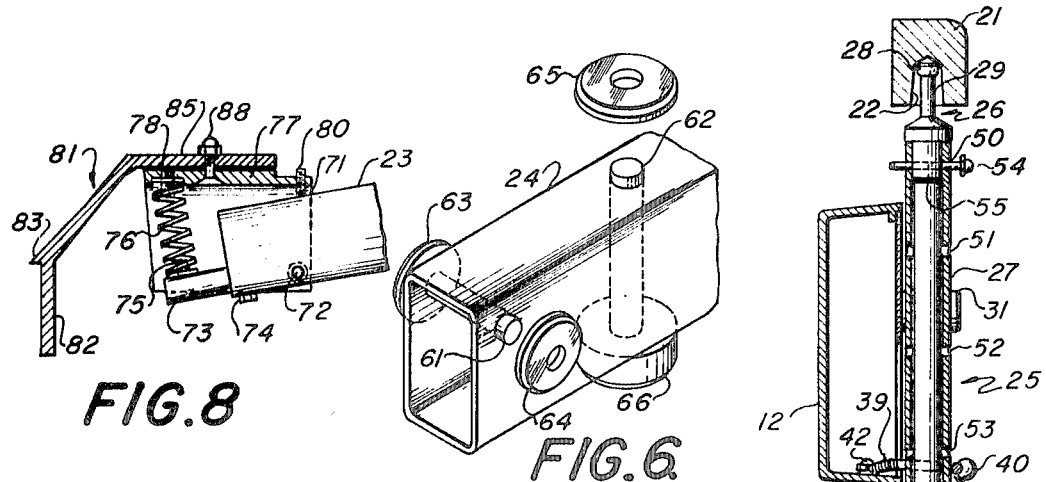
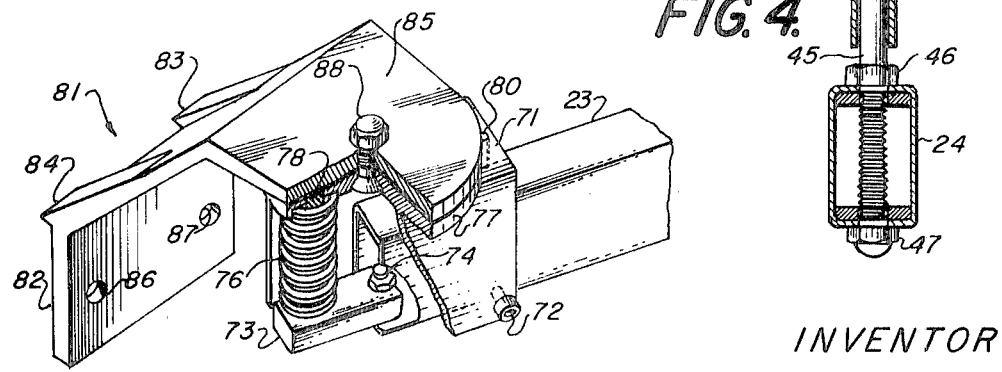
INVENTOR
EDWARD D. WILKERSON

SUPPORT FOR A PORTABLE WHEEL ALIGNER

BACKGROUND OF THE INVENTION

Portable wheel alignment equipments involving optical-transit techniques are well known. These equipments involve the use of two separate wheel alignment units each of which is clamped to opposite vehicle wheels so that measurements may be made.

U.S. Pat. No. 3,445,936, issued to the inventor on May 27, 1969, discloses alignment equipments of this general type.

Within recent years increased emphasis has been placed upon the desirability of aligning large wheels, such as those found upon buses and trucks. Vehicles of this type are usually aligned by driving the vehicles onto wheel turntables located on the runways of pit, power and drive-on racks. The use of racks enables the alignment operator to make the necessary adjustment without undue bending. Additionally, improved access is provided to the underside of the vehicle to enable the necessary alignment corrections to be made.

The above patent discloses an aligner having a pivot post which is elongated and generally straight to enable alignment measurements to be made over the hood of a passenger car. In view of the fact that many buses and trucks have relatively high hoods, a post to enable over-the-hood readings on these vehicles would be excessively long and unwieldly. An aligner pivot post adapted to buses and trucks is shown in the inventor's copending U.S. Pat. application Ser. No. 658, filed Jan. 5, 1970, and entitled "Improvement in Wheel Alignment Apparatus." This modified post has an L-shaped configuration to enable measurements to be made in front of the bus or truck and generally below an otherwise obstructing bumper.

In the modified L-shaped post, the optical-transit arm is generally horizontal during the alignment procedure. The mounting and adjustment of the aligner unit thus creates a weight lifting and handling problem, particularly when the aligner unit must be manually lifted from a remote storage position for clamping upon a wheel rim.

In many instances, the aligner unit is stored on a garage floor either permanently or at least between successive alignments of a plurality of vehicles. This may result in unnecessary damage to the aligner.

SUMMARY OF THE INVENTION

Accordingly, it is a principal object of the invention to provide convenient and safe storage of a portable aligner unit when not in use. When the aligner is to be used, it may be clamped onto a vehicle wheel readily and placed in the desired position without subjecting the operator to the handling of a cumbersome and weighty aligner unit.

As outlined in the Abstract, this object is attained by carrying the aligner on a rack mounted support with generally universal movement being provided. The movement includes changes in both horizontal and vertical positions, as well as changes in the attitude of the aligner unit.

DETAILED DESCRIPTION OF THE DRAWINGS

In order that all of the structural features for attaining the objects of the invention may be readily understood, reference is herein made to the following drawings wherein:

FIG. 3 is a view, partly in section, showing both support arms, their mounting bracket, and the post upon which the aligner unit is carried;

FIG. 4 is an enlarged view partly in section taken along the line 4—4 in FIG. 3 showing the details of the support post and the ball and socket for carrying the aligner;

FIG. 5 is a section view taken along line 5—5 of FIG. 3 showing the bearing wheels and roll which enable the two arms of the support to telescope relative one another;

FIG. 6 is a fragmentary perspective view showing the bearing wheels carried by the inner arm;

FIG. 7 is a fragmentary perspective view showing the retaining yoke attached to the aligner unit to enable adjustable positioning of the aligner unit on the support post;

FIG. 8 is a fragmentary view, partly in section, showing the means for pivotally coupling the arms of the aligner support to the mounting bracket; and FIG. 9 is a perspective view, partly in section, showing further details of the structure of FIG. 8.

DETAILED DESCRIPTION OF THE INVENTION

Figure 1:
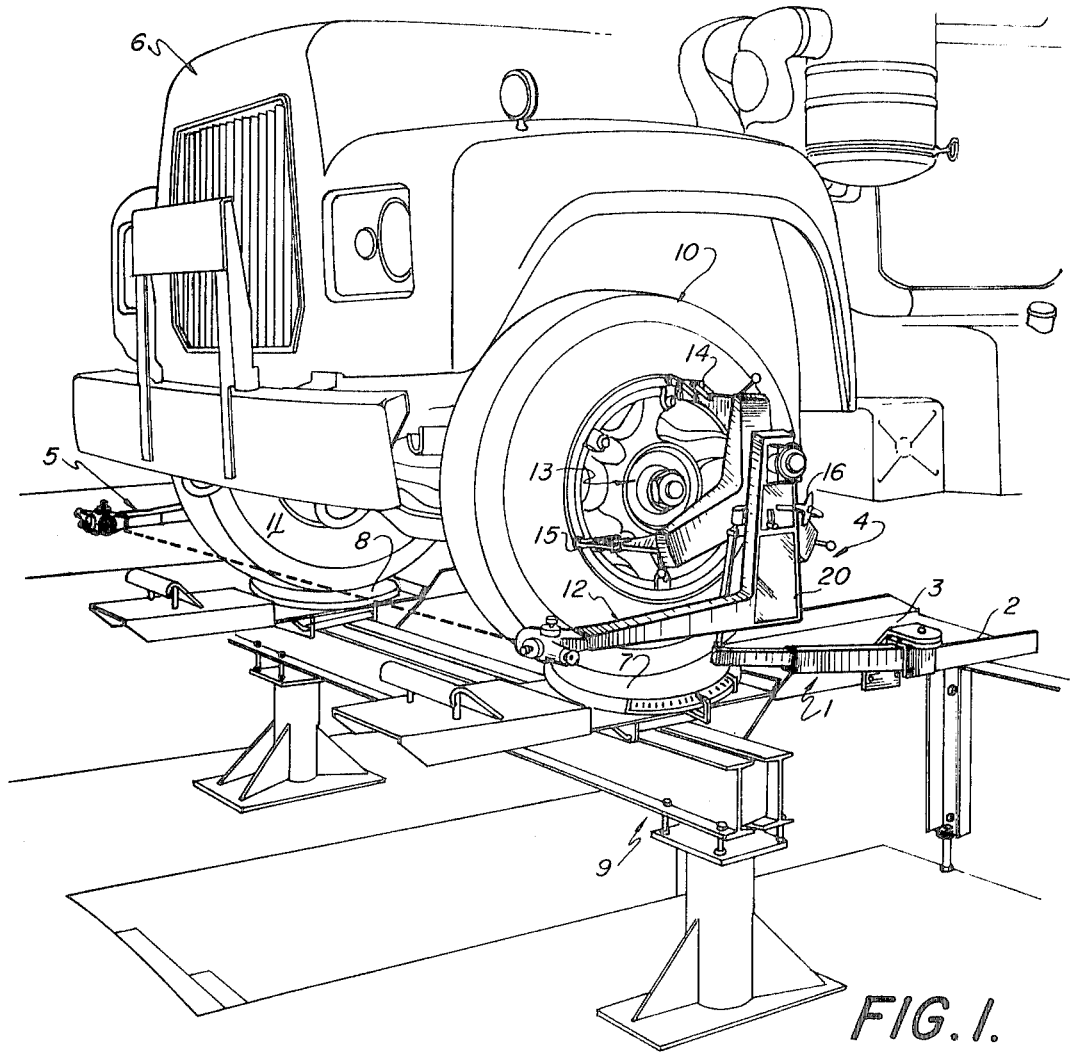
FIG. 1 is a perspective view of a portable wheel aligner unit carried by the support of this invention as applied to a truck wheel.

Referring now to the drawings, the invention shown therein relates solely to wheel aligner support 1 which, for the purpose of illustration, is mounted on runway flange 2 of runway 3 so as to adjustably carry portable wheel aligner unit 4.

In the usual instance, a wheel aligner support (not shown) identical to support 1 is attached to the opposite runway so as to carry wheel aligner unit 5 (FIG. 1). Wheel aligner units 5, 6 are portable optical-transit devices which are employed as a pair to align vehicle wheels.

Truck 6 is driven upon turntables 7 and 8 carried on pit rack 9, for example, so that the front wheels of this truck may be aligned. To perform this operation, it is necessary to apply fixedly wheel aligner units 4 and 5 to the adjacent wheels so that aligner measurements involving optical-transit techniques, well known in the prior art, can be made. Inasmuch as portable wheel aligner units 4 and 5, as now commercially manufactured, generally weigh in the range of 15 to 30 pounds each, the handling of this weight can be extremely cumbersome, making difficult the clamping operation of each aligner unit to its adjacent wheel. Likewise, the storage of these units between alignment operations is time and space consuming, which also often results in unnecessary damage.

Accordingly, it is a primary function of the aligner support 1 to carry substantially all of the weight of the aligner unit 4, for example, but at the same time enable the operator to move the aligner unit horizontally, vertically, and at intermediate attitudes so that proper alignment steps can be performed. This aligner positioning is described hereafter without particular reference to detailed alignment steps as these steps are well known in the art. Storage of the aligner unit is effected easily by simply manually moving aligner support 1 to carry aligner unit 4 away from the runway path.

Figure 2:
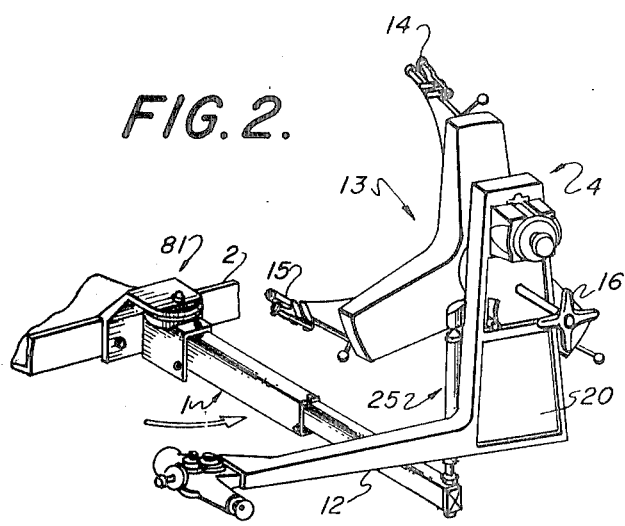
FIG. 2 is an enlarged perspective view of the wheel aligner unit and the support.

The aligner unit 4 shown in the drawings incorporates various improvements in the basic unit described in the inventor's U.S. Pat. No. 3,445,936. These improvements relate generally to the provision of a relatively short L-shaped aligner post 12 so that measurements can be made in front of a truck rather than over the top of a truck hood by a lengthy and unwieldy post. Additionally, aligner wheel clamp 13 (FIG. 2) includes three extensible legs 14, 15 (only two shown) so that aligner unit 4 may be applied to the larger rim diameters typical of truck wheels by turning clamp control 16.

The improvements to adapt the aligner of U.S. Pat. No. 3,445,936 for trucks and buses is described in detail in the inventor's copending U.S. Pat. application Ser. No. 658, filed Jan. 5, 1970, entitled "Improvements in Wheel Alignment Apparatus."

Referring now to FIG. 3, the base portion 20 of L-shaped aligner post 12 is shown as viewed from the rear. A caplike socket 21 is integrally attached to this base. Socket 21 is formed with a recess 22 (FIG. 4). The aligner support 1 of this invention generally comprises an outer arm 23 which receives an extensible and telescoping inner arm 24. Support post 25 is carried by the right end of inner arm 24. A mounting tip 26 is fixed to the upper end of telescoping tube 27. Mounting tip 26 includes a ball 28 carried by stem 29. When aligner unit 4 is carried by wheel aligner support 1, ball 28 is received within recess 22 of socket 21. In view of the fact that recess 22 has an enlarged access opening, aligner post 12, which includes base 20, is capable of a limited angular tilting relative support post 25. Studs 30 and 31 (see FIG. 7) serve as limit stops which prevent excessive relative tilting of aligner base 12 with respect to support post 25.

As is best shown in FIG. 7 (see also FIGS. 3 and 4), retaining yoke 35, which includes a pair of forked arms 36 and 37 coupled to helical springs 38 and 39, respectively, yieldingly engages the outer wall of tube 27 so as to permit the tilting movement provided by socket 21 and ball 28 which is limited by stops 30 and 31.

Retaining yoke 35 includes a ball knob 40 which may be clasped by the alignment operator so as to release the yoke from its relatively tight grip against tube 27 in those instances in which it is desired to lift aligner unit 4 from support 1.

The outer ends 41 and 42 (FIG. 7) of helical springs 38 and 39 are fixed to base 20 so that yoke 40 is attached permanently to aligner unit 4.

Support post 25 includes a finger rod 45 (FIG. 4), the lower terminal end of which is threaded so that the rod may be coupled to inner arm 24 by nut 46 and acorn nut 47.

Tube 27 is formed with four holes 50, 51, 52 and 53. These holes are sized to receive height-adjusting pin 54. When pin 54 is inserted in tube holes 51, 52 and 53, tube 27 may be extended vertically relative finger rod 45 with pin 54 resting on the upper surface 55 of rod 45. This arrangement enables aligner unit 12 to be adjusted vertically relative aligner support arms 23 and 24, for example. End cap 60 is inserted in the right end of arm 24 so as to close the access opening otherwise appearing in this arm.

Referring now to FIGS. 3 and 6, the left end of arm 24 is apertured to receive a generally horizontal axle 61 and a generally vertical axle 62. Wheels 63 and 64 are carried loosely by the projecting portions of axle 61, and wheels 65 and 66 are loosely carried by the projecting portions of axle 62.

When inner arm 24 is inserted within outer arm 23, wheels 63 and 64 serve as a vertical load bearing for arm 24, and wheels 65 and 66 serve as a side load bearing for arm 24.

A roller 67, sandwiched between wheels 69 and 70, is carried upon axle 68. This axle is located within the right end of outer arm 23 (FIGS. 3 and 5). As is best shown in FIG. 5, arm 24 rests against the upper surface of roller 67 so that this roller and the adjacent wheels serve as a vertical load bearing for arm 24. Roller 67 and wheels 69 and 70 thus cooperate with wheels 63 and 64 to provide a complete vertical load bearing for arm 24 which enables this arm to telescope within arm 23. Adjustable limit screw 59 located at the right end of arm 23 passes through the wall of this arm and rests against the upper surface of arm 24 so as to prevent vertical play between arms 23 and 24.

Referring now to FIGS. 3, 8 and 9, an arm saddle 71 is pivotally coupled to the left end of arm 23 by pivot screw 72. In view of the fact that arm saddle 71 has no bottom, pivot 72 permits relative tilting movement between arm 23 and saddle 71 in a vertical plane.

For example, FIG. 3 shows arm 23 in a horizontal position relative saddle 71. This positioning is brought about by the weight of aligner unit 4 on support post 25. In FIG. 8, however, a fragmentary portion of arm 23 is shown tilted relative saddle 71. This positioning occurs when aligner unit 4 is removed from support post 25.

A spring support block 73 is fixed to the left end of arm 23 by screw 74. The upper surface of block 73 carries a stud 75 which receives the lower end of helical spring 76.

The upper surface of saddle 71 carries integrally formed semicircular coupling plate 77. Plate 77 likewise carries a stud 78 which receives the upper end of helical spring 76. When the arm pair 23, 24 is relieved of the weight of the aligner unit 4, spring 76 expands as shown in FIG. 8, pivoting the arms about pivot 72 until adjustable stop screw 80 is contacted by the upper surface of arm 23.

Aligner support 1 is attached to runway flange 2 (FIGS. 1 and 3) by mounting bracket 81. Mounting bracket 81 includes an attachment plate section 82, a pair of projecting lips 83 and 84 which contact the upper surface of runway flange 2 and a cantilever pivot plate 85.

Mounting plate 82 is apertured at 86, 87 (FIG. 9) so that it may be bolted to runway flange 2; and pivot plate is also apertured so that vertical pivot screw 88 may be used to couple plates 77 and 85 together.

In summary, the movements provided by the foregoing structure are as follows:

a. Arms 23, 24 telescope relative to one another;
b. Arms 23, 24 and post 25 pivot in limited vertical angular range about pivot 72;
c. Arms 23, 24 and post 25 pivot in a substantially 180° horizontal angular range about pivot 88;
d. Post elements 27 and 45 telescope relative one another to vary the generally vertically height of aligner unit 4 with respect to the arms 23, 24; and
e. Ball and socket elements 21, 28, together with yoke 35 enable tilting of the aligner unit with respect to post 25.

With the foregoing generally universal movements provided, support arm 1 is capable of being mounted on various vehicle racks to bring aligner units of varying sizes from a storage position to a wheel clamping position for vehicle wheels of different sizes. These functions are accomplished without the operator lifting the total weight of the support, or searching for a storage place for the unit.

It should be understood that the structure shown in the drawings is merely illustrative of the principles of this invention. Modifications can be made without departing from the scope of the invention.

What is claimed is:

1. In the combination of a vehicle support ramp, a portable, optical-transit, pivot-post aligner unit having a wheel clamp and a support for the portable wheel aligner unit, the improvement in which the support comprises a pair of telescoping arms adapted to extend an adjustable length, vertically tiltable and horizontally swingable mounting means for the support coupling one end of the telescoping arm pair to the ramp, a telescoping projecting post coupled to the other end of the telescoping arm pair, and carrying means included as part of the projecting post to support tiltably and rotationally the wheel aligner unit, whereby the wheel aligner unit may be stored adjacent the ramp on the support and manually moved horizontally, vertically, and tilted in altitude relative the wheel to a wheel clamping position on a ramp supported vehicle to be aligned.

2. The combination of claim 1 in which the telescoping projecting post projects from the coupled arm at an angle generally normal to the longitudinal axis of the arm pair, and an extensible yoke coupled to the aligner unit enveloping the projecting post to provide a yielding restraint upon the tiltable and rotational action of the aligner unit relative the telescoping projecting post.

3. The combination of claim 1 in which the mounting means includes a mounting bracket adapted to be fixed to support ramp structure adjacent a vehicle to be aligned, a saddle pivotally coupled to the mounting bracket with the saddle being swingable about a generally vertical axis, one end of the arm pair being received within the saddle, and a spring and a pivot yieldingly coupling the one end of the arm pair to the saddle with the arm pair being movable through a limited angular range in a vertical plane, and the post includes a projecting finger rod and a telescoping tube adjustably enveloping the finger rod with the tube being extensible generally vertically.

4. The combination of claim 4 in which the carrying means includes a mounting tip having a projecting ball adapted to be received within a loosely mating socket attached to the wheel aligner with the aligner capable of limited tilting movement relative the post, and in which an extensible yoke is coupled to the aligner unit to provide a yielding restraint upon the tiltable and rotational action of the unit relative the projecting post.

* * * * *